United States Patent
Weissman

(10) Patent No.: US 7,590,982 B1
(45) Date of Patent: Sep. 15, 2009

(54) SYSTEM AND METHOD FOR VIRTUALIZING PROCESSOR AND INTERRUPT PRIORITIES

(75) Inventor: Boris Weissman, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 1264 days.

(21) Appl. No.: 10/832,056

(22) Filed: Apr. 26, 2004

Related U.S. Application Data

(60) Provisional application No. 60/530,598, filed on Dec. 17, 2003.

(51) Int. Cl.
*G06F 9/46* (2006.01)
*G06F 13/24* (2006.01)

(52) U.S. Cl. .......................... 718/1; 718/103; 710/260; 710/262

(58) Field of Classification Search ...................... 718/1, 718/103; 710/260, 262
See application file for complete search history.

(56) References Cited

U.S. PATENT DOCUMENTS

| | | | | |
|---|---|---|---|---|
| 5,905,897 | A * | 5/1999 | Chou et al. | 710/260 |
| 6,704,925 | B1 * | 3/2004 | Bugnion | 717/138 |
| 7,177,967 | B2 * | 2/2007 | Jeyasingh et al. | 710/260 |

* cited by examiner

*Primary Examiner*—Van H Nguyen
*Assistant Examiner*—Kenneth Tang
(74) *Attorney, Agent, or Firm*—Jeffrey Pearce; Darryl A. Smith

(57) ABSTRACT

Dispatching of interrupts to a processor is conditionally suppressed, that is, only if an old priority value and a new priority value are either both less than or both greater than a maximum pending priority value. This conditional avoidance of dispatching is preferably implemented by a virtual priority module within a binary translator in a virtualized computer system and relates to interrupts directed to a virtualized processor by a virtualized local APIC.

18 Claims, 6 Drawing Sheets

SYSTEM AND METHOD FOR VIRTUALIZING PROCESSOR AND INTERRUPT PRIORITIES

CROSS-REFERENCE TO RELATED APPLICATIONS

This application claims priority of U.S. Provisional Patent Application No. 60/530,598, filed 17 Dec. 2003.

BACKGROUND OF THE INVENTION

1. Field of the Invention

This invention relates to the field of virtualized computer systems.

2. Background Art

The advantages of virtual machine technology have become widely recognized. Among these advantages is the ability to run multiple virtual machines on a single host platform. This makes better use of the capacity of the hardware, while still ensuring that each user enjoys the features of a "complete," isolated computer. Depending on how it is implemented, virtualization also provides greater security since it can isolate potentially unstable or unsafe software so that it cannot adversely affect the hardware state or system files. This and other advantages are also provided by virtualization even in systems with only a single virtual machine. Computer virtualization is described in greater detail below.

Proper virtualization of a computer architecture also requires virtualization of its mechanisms for servicing processor and interrupt priorities. For example, modern operating systems for use in systems compatible with Intel's IA-32 architecture (commonly referred to as "x86") make extensive use of the fine-grain interrupt protection facilities of the Advanced Programmable Interrupt Controller (APIC). Whether an APIC delivers interrupts to the processor core or not is influenced by the processor, task, and interrupt priorities implemented within the APIC. Operating systems frequently change priority levels to dynamically protect the processor from interrupts of certain kinds in select critical regions. Correct virtualization therefore also entails virtualization of the APIC.

Interrupt handling in contemporary Intel x86-based computing systems depends on the Advanced Programmable Interrupt Controller Architecture. Systems that conform to the APIC architecture include the Intel Pentium 4, Xeon, P6, AMD Athlon and Opteron. The APIC architecture defines two kinds of basic functional units: the local APIC unit and the external I/O APIC unit.

The local APIC unit is a per-CPU unit that is implemented in the processor core in contemporary x86 processors. Older Intel 82489DX systems had a "discrete APIC implementation" off-chip. A discrete implementation supported a programming interface similar to the modern integrated local APICs and conformed to the APIC architecture. The local APIC unit receives interrupts from the processor's pins, from internal sources, from external sources via I/O APICs or other processors, and then forwards them to the processor core for servicing when appropriate.

A multi-processor (MP)-compliant system must also contain one or more I/O APIC units implemented as a part of the chipset. The primary function of an I/O APIC is to manage interrupts originated externally to the processor (device interrupts, chipset interrupts) and to relay them to the destination processor. The local and I/O APIC units communicate either through a dedicated APIC bus or a general system bus via APIC messages.

As is mentioned above, complete and correct virtualization of a computer requires proper virtualization of the APIC as well. Often, however, the cost of priority virtualization dominates the entire APIC virtualization overhead and represents a significant fraction of the total virtualization cost. What is needed is therefore an efficient virtualization of processor, task, and interrupt priorities in order to maintain high performance. This invention provides such a virtualization method and system.

SUMMARY OF THE INVENTION

In a computer system that includes a host hardware platform and at least one guest system running on the host platform, in which the guest system includes a virtualized processor and a virtualized interrupt controller, the invention provides a method for handling processor and interrupt priorities, especially task priorities, arising within the guest system. The method comprises detecting an event with the nominal effect of triggering an interrupt of the virtualized processor; comparing an old and a new priority value with a maximum pending priority value; and avoiding dispatching the interrupt to the virtualized processor conditionally, that is, only if the old and the new priority values are either both less than or both greater than the maximum pending priority value.

One way to detect the interrupt-triggering event is to detect an attempted change by guest system code of the old priority value.

In one embodiment of the invention, at least some of the guest system code is converted to corresponding native code of the host platform by binary translation. For at least one instruction or instruction sequence in the converted guest code whose nominal effect is to change the old priority value, the binary translator (for example, in a dedicated virtual priority module) emits and includes as part of a translation of the instruction or instruction sequence an additional code sequence comprising host-executable code for performing the steps of comparing the old and new priority values with a maximum pending priority value and of conditionally dispatching the interrupt to the virtualized processor.

The previous and current priority values may be task priority values, such as are stored in the task priority register (TPR) found in the Intel x86 architecture. The event that would normally trigger the interrupt may then be the presence of a guest instruction affecting the contents of the TPR.

The guest system may be a virtual machine that runs on the underlying hardware platform via either a virtual machine monitor, a dedicated kernel, or both. The invention may also be included in para-virtualized computers such that the virtual priority module is made part of system software in the guest system.

DETAILED DESCRIPTION

Introduction

This invention provides a software mechanism that efficiently virtualizes the processor, task, and interrupt priorities within an APIC by introducing a fast, conservative estimate of the processor interrupt state following a priority change. This makes it possible to avoid a complete recalculation of the APIC internal state for the majority of APIC task priority changes. This estimate can be computed in just a few instructions. Because the invention is particularly well suited for binary translation-based APIC virtualization techniques, it is described primarily in this context, by way of example, and especially in the case of binary translation used in a virtualized computer system. Before delving into the details of APIC virtualization according to the invention, various broader concepts and structures are first described.

General System Configuration

Figure 1:
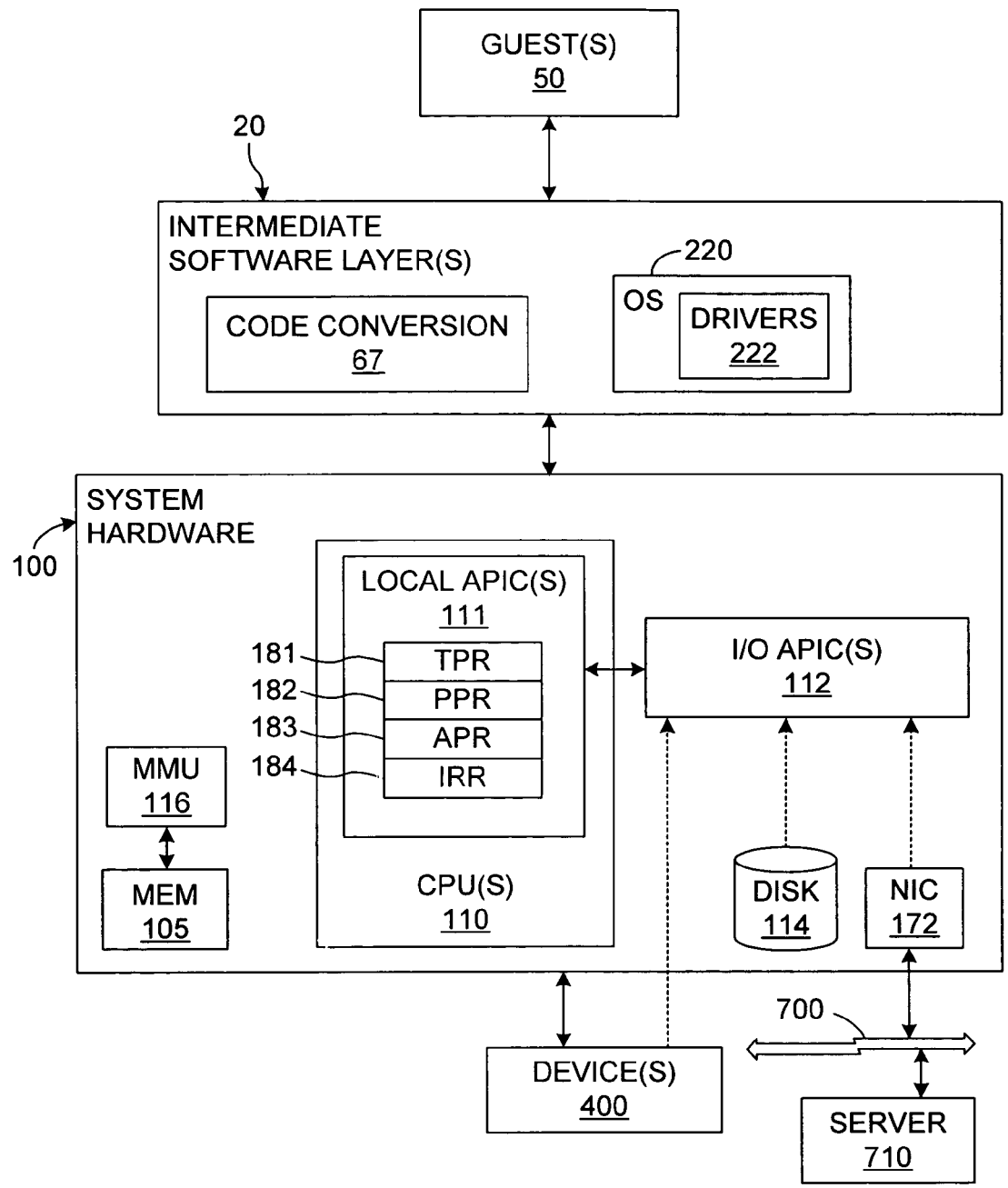
FIG. 1 illustrates the main software and hardware components of the invention.

FIG. 1 illustrates one example of a system in which the invention may be incorporated. A system hardware platform 100 includes one or more processors (CPUs) 110, system memory 105, and at least one storage device, which will typically be a disk 114. The system memory 105 will typically be some form of high-speed RAM, whereas the disk (one or more) will typically be a non-volatile ("persistent") mass storage device. The system memory 105 and the disk or other storage device 114 each constitutes a computer-readable storage medium. The hardware 100 will usually also include other conventional mechanisms such as at least one memory management unit MMU 116 (for example, one per processor), and often one or more conventional network connection device(s) 172 (such as a network adapter or network interface card—"NIC") for transfer of data between the various components of the system and one or more external systems such as servers 710 via a bus or network 700.

Of special relevance to this invention is that the hardware will usually also include at the local and I/O APIC(s) 111, 112 discussed above. Depending on the processor architecture, various registers are also included in the local APIC 111, such as a Task Priority Register (TPR) 181, a Processor Priority Register (PPR) 182, an Arbitration Point Register (APR) 183, and an Interrupt Request Register (IRR) 184. These registers are discussed further below.

At least one intermediate software layer 20 includes, or is, a host operating system 220, or some software that performs the hardware-interface, resource-allocating and control functions of an operating system. The operating system will usually also be loaded or bundled with drivers 222 as needed for various connected devices, both "internal," such as the disk 114 and NIC 172 and "external" devices 400 such as a keyboard, mouse, trackball, touchpad, printer, etc. The general components of an operating system are well known and are therefore not discussed here further.

One or more guest(s) 50 run on the hardware 100 via (or as part of) the system software layer 20. As used in here, a "guest" is any software entity (for example, a traditional OS process, a virtual machine, etc.) that is defined by and directly or indirectly issues (for example, after retrieval from memory) computer-executable code that is to executed on any processor. The guests will typically (but not necessarily) be user-level applications in that at least some of their requests for system resources (including access to the memory 105 and disk 114) are mediated by the OS 220 or similar intermediate software or, indeed, by firmware or hardware that performs the necessary functions. In most systems, the guests are "applications." In implementations in which the invention is included in a virtualized computer system (see below), one or more of the guests may be a virtual machine, which of course may also be considered an application, albeit a very special one. An example of a virtualized computer system is described below.

In most common computer systems, the code that defines and is issued by the guest is part of the architected instruction set of the processor(s) 110 that are to execute it. This is not also so, however. Rather, guests may also issue code that is either wholly or partially from a different instruction set, for example, in cross-architectural virtualized systems, or that for some other reason is not to execute directly on the underlying hardware processor(s), for example, because it has or is deliberately set to an insufficient privilege level.

In systems that cannot, or choose not to, allow all guest code to execute on the underlying processor(s), some form of code conversion module 67 is typically included in one of the intermediate software layers 20 to convert the guest code that is not native to the hardware processor(s) 110 into instructions that are. A well known form of conversion is known as "binary translation," in which case the code conversion module 67 is known as a binary translator, which is shown as component 670 in the figures.

Using binary translation, a guest instruction—or instruction sequence—is converted into one or more instructions. In other words, the translation of a single guest instruction may produce any number of native instructions. Binary translation therefore often causes a drop in performance, but it has advantages as well. For example, the translation need not be "exact," meaning that it is also possible to insert into the translation instruction sequence code that performs other functions besides what the untranslated guest code itself specifies.

One way to mitigate the decreased performance that binary translation typically causes is to avoid translating the same instruction or sequence more than once. Instead, the translation may be stored in a translation cache for immediate recall the next time the instruction is encountered.

Virtualized Embodiments

Figure 2:
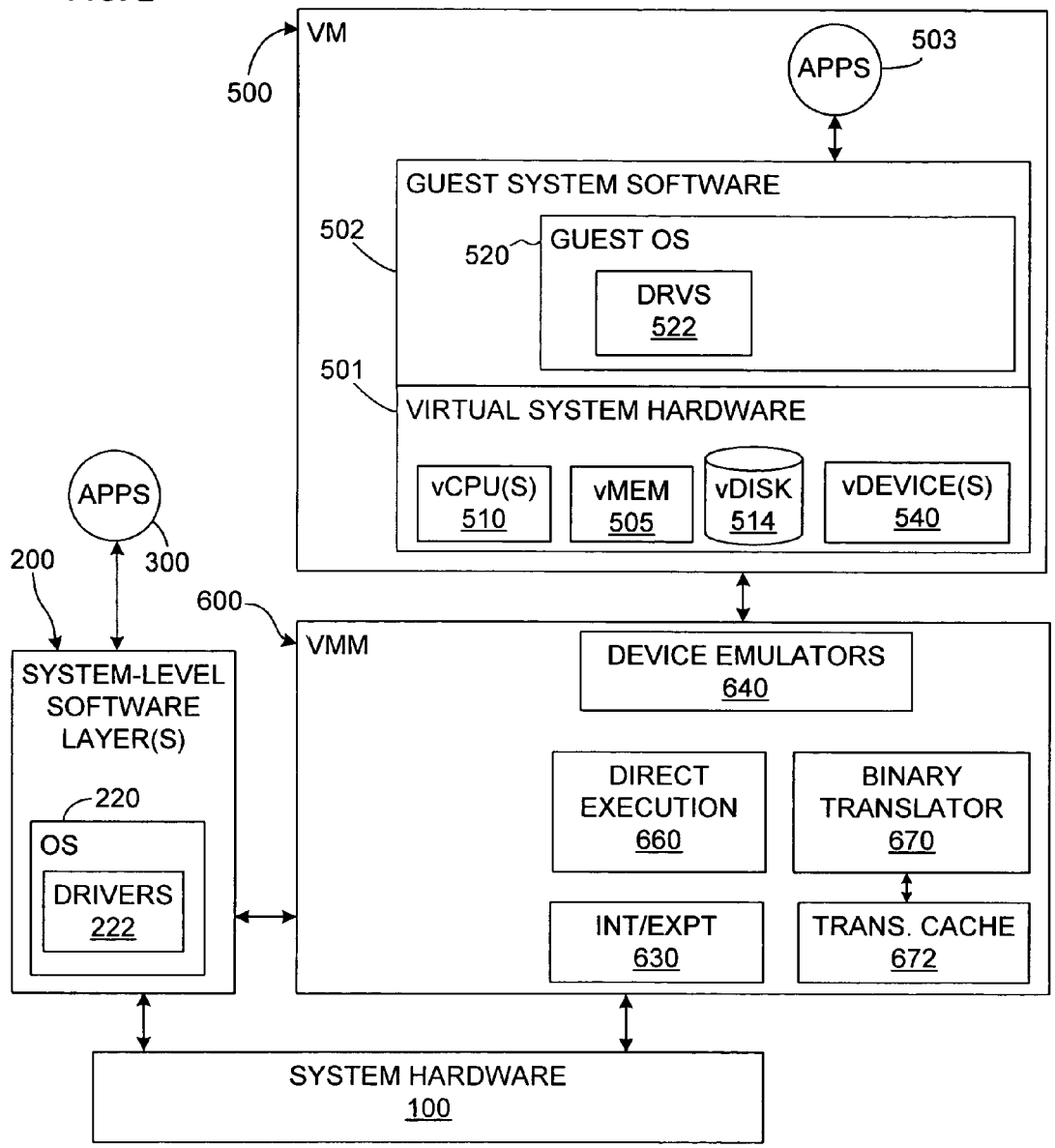
FIG. 2 illustrates a hosted virtualized computer system.

As is well known in the field of computer science, a virtual machine is a software abstraction—a "virtualization"—of an actual physical computer system. FIG. 2 illustrates one type of virtualized computer system that can benefit from the invention. In virtualized embodiments of the invention, each VM 500 constitutes one of the guest systems 50 shown in FIG. 1.

Figure 3:
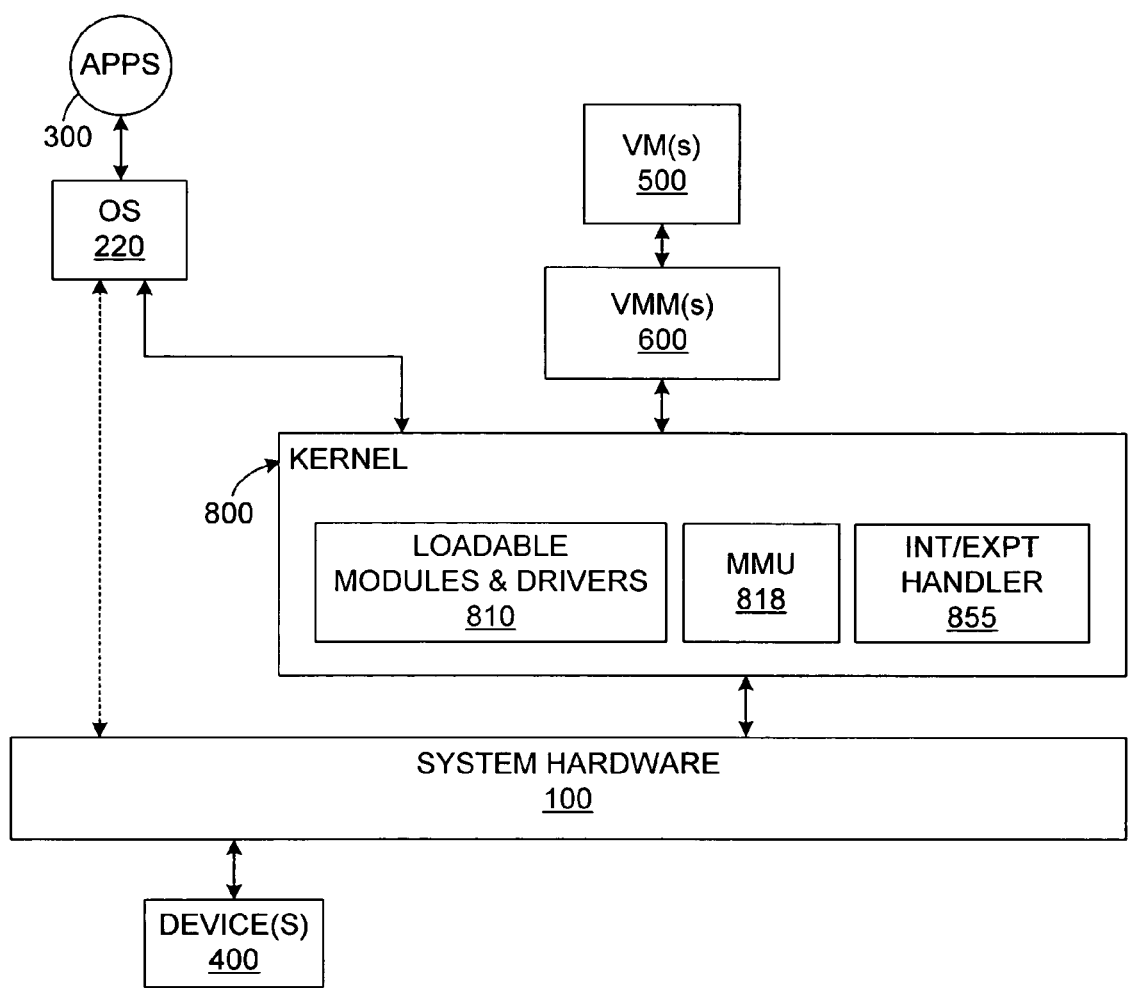
FIG. 3 illustrates a non-hosted virtualized computer system.

Two configurations are in general use—a "hosted" configuration, illustrated in FIG. 2, in which the existing, general-purpose operating system (OS) 220 forms a the "host" OS that is used to perform certain I/O operations; and a non-hosted configuration, illustrated in FIG. 3, in which a kernel 800 customized to support virtual computers takes the place of the conventional operating system. The main components of these two configurations are outlined below. This invention works with either configuration, and, indeed, with any configuration in which binary translation is used.

Each VM 500 will have both virtualized, guest system hardware 501 and guest system software 502. The virtualized, guest system hardware typically includes at least one virtual CPU 510, guest memory 505, at least one virtual disk 514, and one or more virtualized devices 540. Note that a disk—virtual or physical—is also a "device," but is usually considered separately because of its important role in almost all virtualized systems. All of the virtual hardware components of the VM may be implemented in software using known techniques to emulate the corresponding physical components. The guest system software 502 includes a guest operating system 520 (which may simply be a copy of a conventional operating system), and drivers 522 as needed for the various virtual devices 540.

Figure 4:
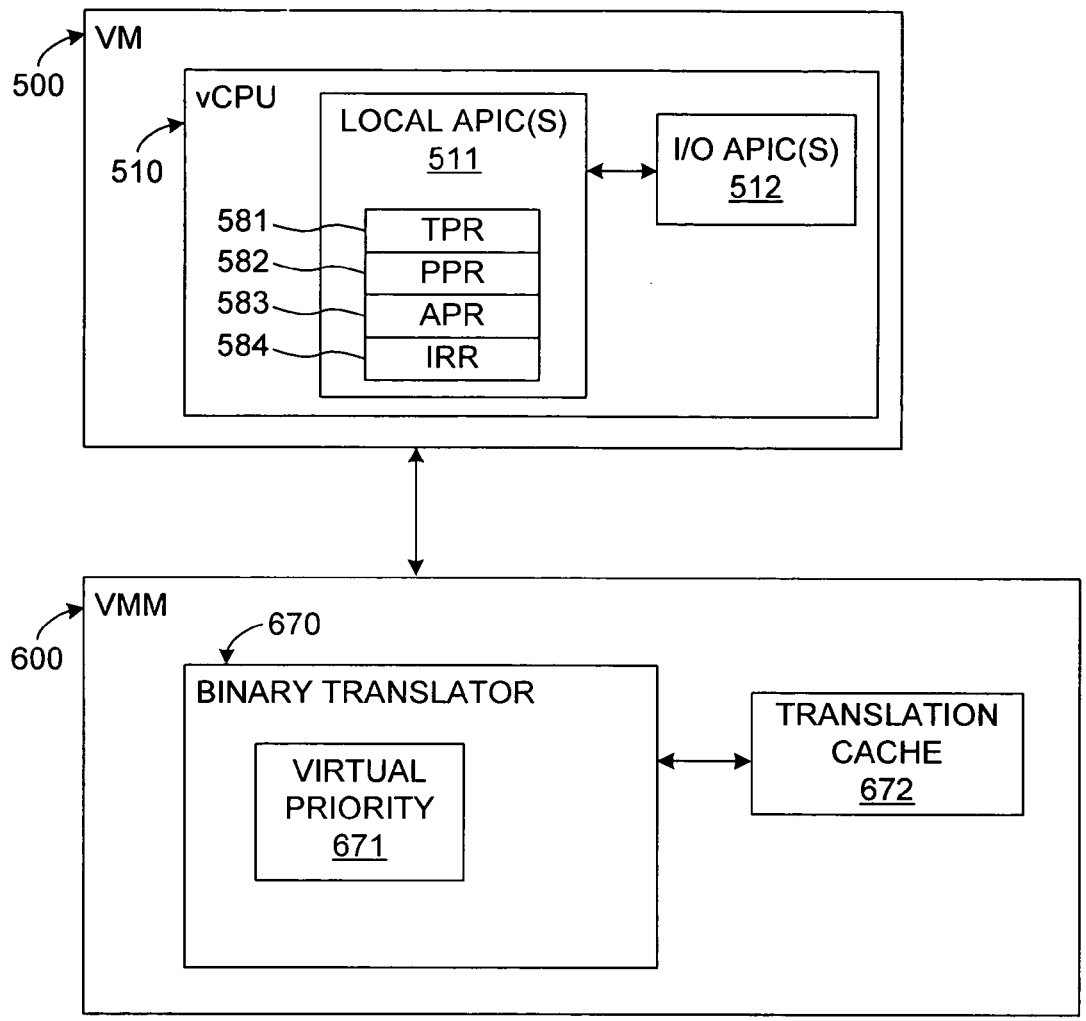
FIG. 4 illustrates the APIC-virtualization of the invention within a binary translation sub-system.

Of relevance to this invention is that the virtualized hardware, in particular, the virtual CPU(s) will also include the same (or analogous) interrupt-processing mechanisms as a "real" CPU. Thus, the virtualized hardware platform will include an I/O APIC 512 and the virtual CPU(s) will include a virtual local APIC 511 with virtualized registers such as the Task Priority Register (TPR) 581, the Processor Priority Register (PPR) 582, and the Arbitration Point Register (APR) 583, and the Interrupt Request Register (IRR) 584. These structures are illustrated in FIG. 4 and are discussed further below If the VM is properly designed, then even though applications 503 running within the VM are running indirectly, that is, via the guest OS 520 and virtual processor(s) 510, they will act just as they would if run on a "real" computer, except for a decrease in running speed that will be noticeable only in exceptionally time-critical applications. Executable files will be accessed by the guest OS 520 from the virtual disk or virtual memory, which will simply be portions of the actual physical disk or memory allocated by the host to that VM. Once an application is installed within the VM, the guest OS retrieves files from the virtual disk just as if they had been pre-stored as the result of a conventional installation of the application. The design and operation of virtual machines are well known in the field of computer science.

Some interface is usually required between a VM and the underlying host platform 100 (in particular, the CPU 110), which is responsible for actually executing VM-issued instructions and transferring data to and from the actual memory 105 and storage devices 114. A common term for this interface is a "virtual machine monitor" (VMM), shown in FIG. 2 as component 600. A VMM is usually a software layer that runs directly on top of a host, or directly on the hardware, and virtualizes at least some of the resources of the physical host machine, or at least of some physical machine. The interface exported to the VM is then the same as the hardware interface of the machine (or at least of some machine), so that the guest OS 520 cannot determine the presence of the VMM.

The VMM 600 also usually tracks and either forwards (to some form of operating system) or itself schedules and handles all requests by its VM for machine resources, as well as various faults and interrupts. An interrupt handling mechanism 630 is therefore included in the VMM.

In most virtualized computer systems, the addresses used by the guest OS 520 to address the guest memory 505 are remapped to addresses of the hardware memory 105. This extra level of address indirection is frequently exploited not only to increase the efficiency and security of a virtualized computer system, but also to provide certain features that are unavailable in a non-virtualized system. Address remapping is usually done in a dedicated module in the VMM, or in some other software layer (such as a kernel), interposed between the VM and the underlying hardware platform. These mechanisms are well known and are therefore not described further here since the invention does not depend on any particular memory addressing scheme.

Although the VM may be configured to be a more or less self-contained software entity, the VMM and the VM may be viewed as together forming a single virtual computer.

Moreover, the various virtualized hardware components such as the virtual CPU(s) 510, the guest memory 505, the virtual disk 514, and the virtual device(s) 540 are shown as being part of the VM 500 for the sake of conceptual simplicity—in actual implementations these "components" are usually constructs or emulations exposed to the VM by the VMM, for example, as emulators 640. One advantage of such an arrangement is that the VMM may be set up to expose "generic" devices, which facilitate VM migration and hardware platform-independence. The VM and VMM are shown in the figures as separate components for the sake of clarity. There may be several VM/VMM pairs (virtual computers) running on a common host; a single VM/VMM pair is shown in FIG. 2 for simplicity.

In considering the description of the invention below, one should keep in mind that the state of all of the virtual hardware components and data structures defining the VM are observable and, in fact, controllable, by the VMM. In particular, the state of all the virtual CPU registers is observable and controllable by the VMM, and the VMM can also control which interrupts are exposed to the virtual processor(s).

VMM transparency is not required by this invention; rather, the priority-virtualizing mechanism of the invention may also be incorporated in so-called "para-virtualization" systems in which the guest OS is aware that it is being virtualized, and has an explicit interface to the VMM. In such systems, the VMM is sometimes referred to as a "hypervisor." Moreover, other systems have been proposed in which the guest OS 520 is specifically modified to it to directly access the actual system hardware; in such systems, either a VMM or related software component is not included at all, or is bypassed in some situations.

Hosted Virtual Computers

The configuration illustrated in FIG. 2 is used in the Workstation product of VMware, Inc., of Palo Alto, Calif. In this configuration, the VMM 600 is co-resident at system level with the host operating system 220 such that both the VMM and the host OS can independently modify the state of the host processor. However, the VMM calls into the host OS via a special one of the drivers 222 and a dedicated user-level application 300 to have the host OS perform certain I/O operations on behalf of the VM. The virtual computer in this configuration is thus hosted in that it runs on the existing host hardware platform 100 together with an existing host OS 220. A hosted virtualization system of the type illustrated in FIG. 3 is described in U.S. Pat. No. 6,496,847 (Bugnion, et al., "System and Method for Virtualizing Computer Systems," 17 Dec. 2002), which is incorporated here by reference.

Non-Hosted Virtual Computers

In other, "non-hosted" virtualized computer systems, a dedicated kernel 800 takes the place of and performs the conventional functions of the host OS, and virtual computers run on the kernel. FIG. 3 illustrates such a configuration, with a kernel 800 that serves as the system software for the VM/VMM pairs, only one of which is shown, for the sake of simplicity. Compared with a system in which VMMs run directly on the hardware platform 100, use of a kernel offers improved performance because it can be co-developed with the VMMs and be optimized for the characteristics of a workload consisting of VMMs. Moreover, a kernel can also be optimized for I/O operations and it facilitates provision of services that extend across multiple VMs (for example, for resource management). The ESX Server product of VMware, Inc., has such a configuration.

Because the VMs and VMMs run on the kernel 800, one could of course say that the kernel is a "host." On the other hand, the kernel 800, such as in ESX Server, is more dedicated to and optimized for use in virtualized systems as opposed to being an unmodified or only slightly modified standard OS that is used primarily for other purposes. The term "non-hosted" is used here simply to indicate this distinction. It is to be understood, however, that the distinction could be blurred in a system configured as in FIG. 3, but with the operating system 220 (or, indeed, the hardware platform 100) more extensively modified to support virtualization.

At boot-up time, an existing operating system 220 (which may be of the same type as the host OS 220 in the configuration of FIG. 3) may be at system level and the kernel 800 may not yet even be operational within the system. In such case, one of the functions of the OS 220 may be to make it possible to load the kernel 800, after which the kernel runs on the native hardware 100 and manages system resources using such components as various loadable modules and drivers 810, a memory management unit 818, at least one interrupt and exception handler 855, etc. In effect, the kernel, once loaded, displaces the OS 220. Thus, the kernel 800 may be viewed either as displacing the OS 220 from the system level and taking this place itself, or as residing at a "sub-system level." When interposed between the OS 220 and the hardware 100, the kernel 800 essentially turns the OS 220 into an "application," which has access to system resources only when allowed by the kernel 800. The kernel then schedules the OS 220 as if it were any other component that needs to use system resources.

The OS 220 may also be included to allow applications 300 unrelated to virtualization to run; for example, a system administrator may need such applications to monitor the hardware 100 or to perform other administrative routines. The OS 220 may thus be viewed as a "console" OS or "service console." In such implementations, the kernel 800 preferably also includes a remote procedure call (RPC) mechanism and/or a shared memory area to enable communication, for example, between the VMM 600 and any applications 300 installed to run on the console OS 220.

The console OS 220 in FIG. 3 is labeled the same as the host OS 220 in FIG. 2. This is to illustrate that the OS 220 kernel may usually be unmodified, or at most only slightly modified, in order to support either the host and non-hosted virtualized computers. In fact, at least in the virtualization products of VMware, Inc., "off-the-shelf" or only slightly modified commodity operating systems such as Linux and Microsoft Windows may be used as the host or console operating systems. In the ESX Server product of VMware, for example, the console OS is a modified Linux distribution.

The invention may be used in any system that employs both binary translation (or analogous code conversion) and virtualization of priorities, so this invention does depend on a distinction between the concepts of a "hosted" versus a "non-hosted" architecture.

Binary Translation Vs. Direct Execution

As is known, for example, from U.S. Pat. No. 6,397,242 (Devine, et al., 28 May 2002), which is incorporated here by reference, some virtualization systems allow VM instructions to run directly (in "direct execution" mode) on the hardware CPU(s) when possible. When necessary, however, VM execution is switched to binary translation, during which the VM is running in the VMM and the VM instructions are converted—translated—into a different instruction or instruction sequence, for example, to enable execution at a safe privilege level; if no emulation is needed, then original VM instructions may also be copied directly into a translation cache. The VMM 600 is therefore shown in FIG. 2 with a direct execution engine 660, a binary translator 670, and a translation cache 672 which holds the sequences of translated instructions; the VMM will generally also include these components in non-hosted systems.

In the system described in U.S. Pat. No. 6,397,242, for the sake of speed, VM instructions are normally allowed to execute directly. The privilege level of the physical CPU is, however, set such that the hardware platform does not execute VM instructions that require a more privileged level than the VM is set at. Instead, attempted execution of such an instruction causes the platform to issue a fault, which the VMM handles in part by executing a software module that causes switching of VM execution to binary translation. Direct execution is then resumed at a safe point in the VM instruction stream. This dual-execution mode feature may be used in both hosted and non-hosted configurations of the virtualized computer system.

This invention does not depend on any ability to execute guest instructions directly, but rather operates in the context of converted (for example, binary-translated) code. The invention is described in the context of binary translation, with a dedicated binary translator, by way of example, and because it is in this context that the invention is most likely to be applied.

Virtualizing the IA-32 Interrupt Subsystem

The inventive techniques described below can be applied to virtualize the interrupt subsystem of any architecture as long as it includes the various data structures used. Skilled computer scientists and programmers will know how to adapt the techniques to different architectures. Nonetheless, because the Intel IA-32 architecture is at present the most prevalent, the invention is described with reference to it.

See FIG. 4. Virtualizing the IA-32 interrupt system must include a complete virtualization of the APIC architecture. Thus, as mentioned above, the virtualized hardware platform will include code and data structures that emulate the I/O APIC(s) 512, the Task Priority Register (TPR) 581, the Processor Priority Register (PPR) 582, and the Arbitration Point Register (APR) 583. The design of this code and necessary data structures are known in the field of computer virtualization and, indeed, are already included in commercially available virtual machine products, such as those sold by VMware, Inc. This invention does not require modification of these existing software constructs.

In the following discussion, unless otherwise indicated, the various hardware structures mentioned are the virtualized, emulated counterparts in the virtual computer or other guest system.

Unique to the invention is a virtual priority module 671 comprising computer-executable code that implements the various procedural steps described below using known programming techniques.

In broadest terms, the IA-32 APIC architecture provides facilities to support two kinds of mutually complimentary services: 1) interrupt routing and dispatch on the target virtual CPU(s); and 2) protection of the virtual CPU from the interrupts in certain critical regions (sections of code that should be executed atomically).

Interrupt routing includes routing of interrupts from:
a) internal sources connected either directly to the processor's local interrupt pins, or indirectly via, for example, an 8259 Priority Interrupt Controller ("PIC");
b) external devices connected to the input pins of the I/O APIC 512;
c) inter-processor interrupts (IPIs) originating in other processors; and/or
d) interrupts originating within the processor itself (APIC timer, performance counters, thermal sensor, APIC internal errors, etc.).

Upon receiving one of these events, the local APIC 511 performs an internal state transition, which may result in an interrupt being delivered to the processor core. The new APIC state is a function of the old state and the interrupt event that triggered the transition. The APIC architecture (which will of course also be emulated in the virtualization) unambiguously defines the resulting APIC state for all possible combinations of the pre-existing APIC state and an interrupt event. The APIC architecture also prescribes which of the APIC states result in interrupts being forwarded to the processor core.

The local APIC architecture also defines a fine-grained mechanism to selectively prevent interrupts of certain classes from interrupting the processor. This provides a means for dynamic protection of the processor from the interrupts in select critical regions.

While the two APIC-provided services are intentionally complimentary and designed to work in concert, there is an important difference between the two with respect to virtualization. The APIC routing function is directly related to the interrupt rates of external or internal devices. The virtualization overhead of the routing service is, therefore, directly related to the interrupt rates of communications devices such as network interface cards (NICs), virtualized as well as physical, that have a high interrupt frequency. While the interrupt rates induced by the high-throughput communications devices may be high by device standards, they are significantly lower than the CPU clock speed—one interrupt per tens of thousands to millions of CPU cycles even for the fastest devices.

Unlike the interrupt routing service, the interrupt protection service is entirely under software control, such as from the VMM. The APIC mechanism to selectively enable or disable different interrupt classes may be activated or deactivated by software at any time, irrespective of the device interrupt rates. Some operating systems (Windows NT, Windows 2000, 2003, Solaris 8-10 for x86) use very fine-grained priority-based interrupt protection models such that APIC protection services are potentially accessed multiple times between successive interrupts. For instance, it is common to change interrupt priorities when acquiring or releasing synchronization objects, transitioning between OS abstraction layers, entering or leaving critical regions, etc.

Traditional interrupt clustering techniques aimed at reducing the overhead of interrupt virtualization have no direct effect on the virtualization overhead of the interrupt protection services. For instance, in advanced operating systems such as the Windows 2000 family, the bulk of APIC activity is due to engaging protection services. There is generally less APIC activity induced by routing of hardware interrupts even for interrupt-heavy workloads. Efficient virtualization of APIC protection services is therefore paramount to a high-performance virtualization of the x86 interrupt system.

Protection Services: Interrupt, Task, and Processor Priorities

The local APIC 511 (emulating its hardware counterpart) uses a priority interrupt scheme. There are three different kinds of priorities that influence interrupt dispatch: 1) interrupt priority; 2) task priority (APIC TPR); and 3) processor priority (APIC PPR).

In x86 architectures (analogous features will be found in other architectures), interrupt priorities determine the timeline with which the interrupt should be handled relative to the activities of the processor and other interrupts. In x86 architectures (analogous features will be found in other architectures), interrupt priorities are associated with individual interrupt vectors and range, for example, from 0 (the lowest) to 15 (the highest). Thus:

$$\text{interrupt priority}=\text{vector}/16$$

Within a priority class, the prioritization of interrupts is determined by the vector number—the higher the vector number, the higher the priority class.

Task priorities are defined in the same space as interrupt priorities. Task priorities are generally associated with either logical threads of control (threads, processes), or modules (for example, thread priority may be raised on the way into a module and lowered on the way out). Task priorities are controlled entirely by software and can be changed by writing to the local APIC TPR 581, which usually contains a single number that indicates the software-set priority of the current task. Task priorities are often used by operating systems to implement an internal ranking scheme (such as IRQLs in the Windows family).

Processor priority is a function of task priority (controlled by software) and the priority of currently serviced interrupts. With some simplifications, processor priority is the higher of the two: task priority as defined in the TPR and the highest priority of all interrupts currently in service. Entering an interrupt service routine (ISR) may change the processor priority. Switching to a different thread may also change processor priority (via a TPR write). Current processor priority is kept in the local APIC PPR register 582 and can be read, but not written, by software. The standard APIC priority scheme is formulated as follows: the local APIC interrupts the processor on behalf of a pending interrupt if and only if this interrupt's priority is higher than the current processor priority (PPR), which, although a hardware (here, virtualized) indicator that can be influenced by software as well. The APIC is responsible for queueing pending interrupts until such dispatch becomes possible.

Following the convention used to describe the Intel x86 architecture, let V[n:m] represent bits m to n of vector V. The value of PPR that determines whether a pending interrupt is dispatched to the processor is defined as:

IF TPR[7:4]>=ISRV[7:4]
    THEN
        PPR[7:0]=TPR[7:0]
    ELSE
        PPR[7:4]=ISRV[7:4]
        PPR[3:0]=0 where ISRV is the vector number of the highest priority In-Service Register (ISR) bit that is set (ISR is a 256-bit register).

The P6 and Pentium family of processors also has an Arbitration Priority Register (APR) that holds the current priority of the processor used during the lowest priority arbitration.

The APR value is also tied to TPR:

IF (TPR[7:4]>=IRRV[7:4] AND (TPR[7:4])>ISRV[7:4])
    THEN
        APR[7:0]=TPR[7:0]
    ELSE
        APR[7:4]=max(TPR[7:4] AND ISRV[7:4], IRRV[7:4])
        APR[3:0]=0

Of course, although the indicated vector bits accord with the published Intel conventions, this invention does not depend on any particular convention or bit designation.

When a guest such as a virtual machine writes a new value into the TPR register 581, new PPR and APR values must be recalculated. An interrupt is dispatched to the processor core following such modification if and only if the new PPR is below the interrupt priority of a requested interrupt pending in the IRR register (also a 256 bit register in the x86 architecture).

Since TPR mutations occur at a high rate, it is desirable to reduce the overhead of TPR virtualization as much as possible. For virtualization systems relying on binary translation techniques, it is also desirable to handle the common case of TPR mutations in the binary translated code and engage the full-fledged APIC emulation module 511 only when TPR writes induce interrupt dispatch to the processor core. This invention meets this need.

Quick Conservative Estimate Scheme

Figure 5:
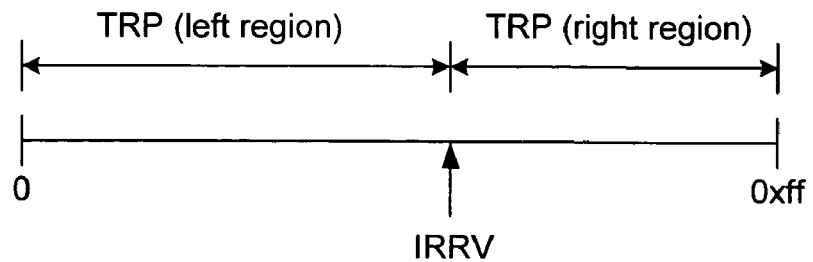
FIGS. 5-9 illustrate different interrupt situations that are handled by the APIC-virtualization mechanism provided by the invention.

See FIG. 5 and consider the space of interrupt priorities from, for example, 0x0 to 0xff. Let IRRV be the value of the maximum priority of a pending interrupt request in IRR that has not yet been acknowledged or serviced by the processor; as just one example, the corresponding interrupt may have been temporarily masked. Such a request is typically generated by an event external to the processor itself, such as events relating to the OS, devices, etc.

IRRV partitions the space of all priorities into two regions or equivalence classes:

left region: [0, IRRV) right region: [IRRV, 0xff]

In FIGS. 5-9, the values illustrated above the horizontal (0 to 0xff) line are software-controllable and the values indicated below the line are not, or can at most be controlled incompletely.

The inventor has discovered that, for TPR assignments, if the old and new TPR values fall within the same region, then no interrupts need to be dispatched to the processor core at all. Thus, if the old and new TPR values are both either greater than or less than IRRV, the APIC virtualization according to the invention avoids, that is, suppresses or abstains from or blocks, dispatching the interrupt. On the other hand, if IRRV falls numerically between the old and new TPR values, then the interrupt may be dispatched, although this does not necessarily mean that the interrupt must be dispatched; rather, in this case, full APIC emulation is run to compute precisely if an interrupt needs to be asserted.

This discovery enables a very quick conservative estimate of whether a TPR assignment induces an interrupt, based upon the inspection of only three scalar values: the old TPR value, the new TPR value, and the IRRV. The absolute majority of TPR assignments for modern operating systems do not trigger interrupts and can be handled extremely efficiently, especially in the presence of binary translation. In particular, in the common case of TPR changes that do not trigger interrupts, it is not necessary to recompute new PPR and APR values. This assertion may be proven as follows:

Consider first the case of the new and old TPR values lying in the left region and then the case of the new and old TPR values lying in the right region. Note that a new TPR value can be assigned by an instruction such as:

mov TPR, %20

This also shows a way for the VMM (for example, the virtual priority module 671 in the binary translator 670) to detect VM changes to TPR (or other register) values: Whenever the binary translator observes any instruction (such as mov, add, etc.) that affects the value contained in the TPR, it will also be able to observe what the new value is to be.

Figure 6:
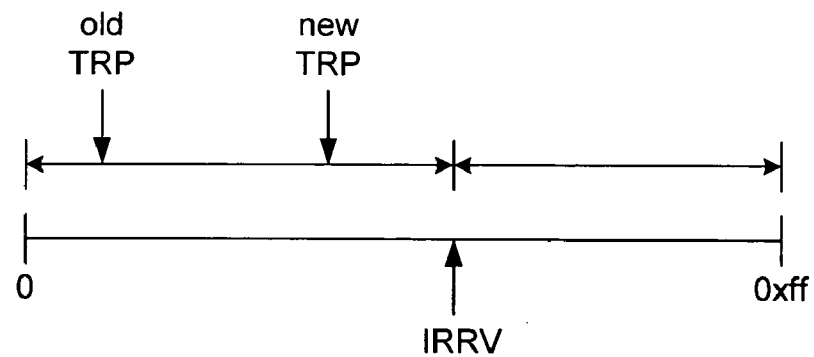

1) New and Old TPR Values in the Left Region (FIG. 6)

Figure 7:
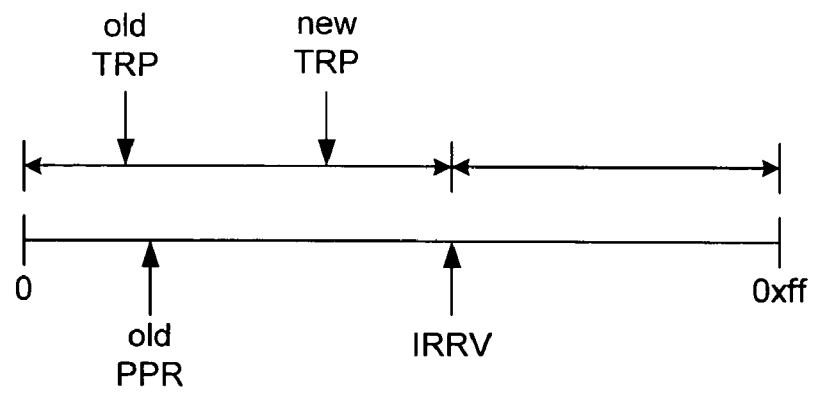

Within this case, there are two sub-cases: a) the old PPR falls within the left region; and b) the old PPR falls within the right region. Consider each.

a) Old PPR in the Left Region (FIG. 7)

Because IRRV>(old PPR) at the time of the TPR assignment, the processor INTR line (an APIC hardware-asserted flag) must have been in the asserted state, that is, a condition for interrupting the processor was satisfied.

Since at the time of the TPR assignment the INTR line is already asserted, the only effect the assignment may have is to deassert the INTR line. However, since the new TPR value is confined to the left region, the new PPR value is:

new PPR=max(old PPR,new TPR)<IRRV

Figure 8:
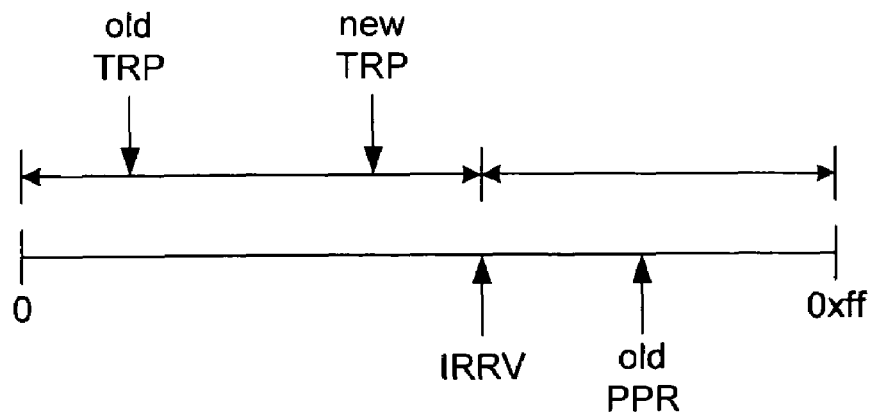

The interrupt line therefore remains asserted after the assignment—TPR change has no effect on the processor INTR line.

b) Old PPR in the Right Region (FIG. 8)

At the time of the assignment (old PPR)>=IRRV and therefore the INTR line was deasserted.

Since (old PPR)>(old TPR) prior to the assignment, the old PPR must have been equal to the highest priority of the interrupt in service at the time of the assignment.

Since (old PPR) is in the right region, it must also be true that (new TPR)<(old PPR); therefore, after the TPR assignment, PPR remains equal to the highest priority of the interrupt in service and PPR>=IRRV is still true. Therefore, the INTR line remains deasserted—TPR change had no effect on the INTR line state.

Figure 9:
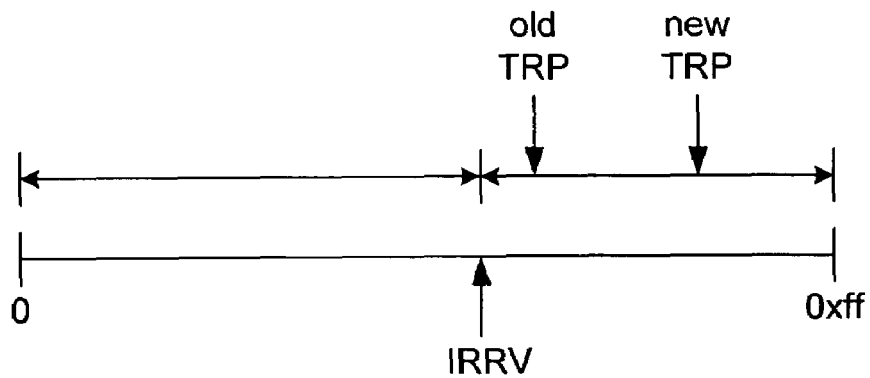

2) The Case of Old and New TPR Values in the Right Region (FIG. 9)

Here there is only one case to consider: both (old PPR) and (new PPR) must be in the right region, because PPR is never less than TPR. (By definition, PPR=max(TPR, ISR))

In this case, (old PPR)>=IRRV and (new PPR)>=IRRV. Therefore, the INTR line was deasserted prior to the assignment and must remain deasserted after the assignment.

As long as the old and the new TPR values remain in the same region, the analysis above shows that no INTR line state change is possible. This means that one can avoid computing new PPR and APR values for most TPR changes.

Implementation

The observation above suggests a fast and tight estimate of whether INTR line change is possible on each TPR change: If the INTR line change is possible, then a complete new APIC state is recomputed and interrupt delivery emulation code is invoked. However, in the common case of TPR assignments, no INTR line changes are possible and the entire TPR assignment emulation cost is just several instructions. For instance, over 98% of TPR assignments done by some modern operating systems (for example, the Windows 2000 family) result in both the old and the new TPR values being in the same region. In binary translation-based emulation systems, this quick check could therefore be emitted to emulate the original TPR assignment instruction. Invocation of the complete APIC emulation module may be delayed until after the quick check reports a possible INTR line change. The virtual priority module 671 can therefore be implemented as a compact code block that checks whether an INTR line change is possible, and allows code causing forwarding of the interrupt only in the cases where change is possible. As the discussion above explains, and FIGS. 5-9 illustrates, the module 671 can accomplish this simply by examining the old and new TPR values and the IRRV.

One minor complication (assuming the Intel x86 architecture) is that the least significant bytes of PPR and TPR should be ignored in priority computations and comparisons. This is not a substantial complication, however.

What follows is one possible implementation (expressed using standard Intel x86 instructions) of the invention that involves only a single branch (Intel operand order). The scalar IRRV value with four lower bits masked is maintained in a globally accessible memory location (corresponding to the virtualized IRR register), indicated in the example code below as IRRV, and is updated on each interrupt request to avoid repeated scans of the 256-bit IRR register:

mov bl, 0xff /* 0xff chosen to skip extra cmp */

```
mov ah, oldTPR
and ah, mask /* mask lower 4 bits of oldTPR */
cmp ah, IRRV /* set CF if oldTPR in left region */
addc bl, 0 /* bl=(oldTPR<IRRV) ? 0:0xff */
mov ah, newTPR
and ah, mask /* mask lower 4 bits of newTPR */
cmp ah, al /* set CF if newTPR in left region */
addc bl, 0 /* bl=success or failure */
jz INTRMayChange /* failure: CF was set only once */
. . . /* success: continue execution */
```

INTRMayChange:
fully recompute new APIC state

If the new and old TPR values are in different regions, then the carry flag CF will be set once and the register bl will contain 0 at the end of this sequence—a failure indicator. If both old and new TPR values are in the left region, then the carry flag CF will be set twice and register bl will contain 1 at the end of the sequence—success. If both old and new TPR values are in the right region, then the carry flag will not be set and register bl will contain its initial value of 0xff at the end of the sequence—also success.

Although this implementation is efficient and takes into account certain features of the x86 architecture (such in masking bits), not all of these instructions may be needed in other architectures, and there are other ways of comparing oldTRP, newTPR and IRRV besides using the carry flag. Skilled programmers will readily be able to choose code sequences that are appropriate and efficient for their desired implementations of the invention.

The binary translator may then emit this (or an equivalent) code sequence as part of the translation of any guest instruction that affects the TPR value. The effect of the additional emitted code is that code causing recomputation of the APIC state will be executed only if the old and new TPR values are in different regions (not both greater than or less than the current IRRV).

Alternative Architectures

The invention is described above with reference to features of the x86 architecture. This is by way of example, taking into account that the x86 architecture is by far the most prevalent at present. The invention may be used, however, in any architecture that relies on an APIC for interrupt handling. For example, the AMD x86-64 and the Intel EM64T are two alternative architectures that can benefit from the invention, although the 64-bit Intel IA-64 architecture does not have a PPR in addition to the TPR (see "Intel IA-64 System Architecture. Software Developer's Manual," Volume 2: IA64 System Architecture, Revision 1.1, July 2000). Skilled system-level software designers will know how to adapt the invention to other architectures, however, given the description of the invention above.

Location of Virtual Priority Module

In the embodiment of the invention illustrated in FIG. 4, the virtual priority module 671 is incorporated into the binary translator 670 within the VMM. This is a particularly advantageous choice in that it maintains the transparency of the virtualization while still providing the improved efficiency made possible by the invention. However, the virtual priority module 671 may be included in any software that is able to inspect guest code, to determine whether a particular instruction or instruction sequence would normally trigger an interrupt of the guest system's processor 510, and to prevent dispatching the interrupt if the old and new TPRs are both either greater than or less than the maximum pending interrupt request IRRV. The virtual priority module 671 could thus instead be included in the kernel 800 of a non-hosted virtualized computer system, or even within the guest system software (for example, in the guest OS 520) in para-virtualized systems. Indeed, at the cost of sacrificing the transparency of virtualization and the interchangeability and generality of VMs designed as exact emulations of existing computers, it would also be possible to incorporate code corresponding to the virtual priority module 671 within the virtualized local APIC 511 itself.

It would even be possible to modify hardware structures such as the local APIC to implement the method according to the invention in order to speed up the logic that determines if an interrupt must be dispatched to the hardware processor.

I claim:

1. A method for responding to an event when emulating an interrupt controller in a computer system, the interrupt controller having associated therewith a first priority, the first priority having a current value, wherein the event gives rise to a new value for the first priority, wherein a plurality of interrupts are pending with the interrupt controller, a maximum interrupt priority value being defined as a priority value associated with a first interrupt of the plurality of pending interrupts, the first interrupt having the highest priority of all pending interrupts, the method comprising:
    comparing the current value and the new value for the first priority with the maximum interrupt priority value; and
    if the current value and the new value are both less than the maximum interrupt priority value or if the current value and the new value are both greater than the maximum interrupt priority value, abstaining from an emulation of the interrupt controller in response to the event without dispatching an interrupt in response to the event; or
    if one of the current value and the new value is greater than the maximum interrupt priority value and the other of the current value and the new value is less than the maximum interrupt priority value, running an emulation of the interrupt controller in response to the event and determining whether to dispatch an interrupt in response to the event based on this emulation,
    wherein running an emulation of the interrupt controller in response to the event comprises determining a new processor priority value based in part on the new value for the first priority and comparing the new processor priority value to the maximum interrupt priority value to determine whether to dispatch an interrupt in response to the event, and wherein a new processor priority value is not determined in response to the event if the current value and the new value are both less than the maximum interrupt priority value or if the current value and the new value are both greater than the maximum interrupt priority value.

2. A method as in claim 1, wherein the computer system comprises a host hardware platform and a guest system running on the host platform, wherein the interrupt controller is a virtualized Advanced Programmable Interrupt Controller (APIC) comprising a Task Priority Register (TPR) for holding values for the first priority and an Interrupt Request Register (IRR) for holding the maximum interrupt priority value, and wherein the event comprises an attempt to write the new value to the TPR.

3. A method as in claim 2, wherein the virtualized APIC further comprises a Processor Priority Register (PPR) for holding a processor priority value, wherein running an emulation of the interrupt controller in response to the event comprises determining a new processor priority value based in part on the new value for the first priority and comparing the new processor priority value to the maximum interrupt priority value to determine whether to dispatch an interrupt in response to the event, and wherein a new processor priority value is not determined in response to the event if the current value and the new value are both less than the maximum interrupt priority value or if the current value and the new value are both greater than the maximum interrupt priority value.

4. A method as in claim 1, wherein the computer system comprises a host hardware platform and a guest system running on the host platform, and the event comprises an attempted change by guest system code of the first priority value.

5. A method as in claim 4, further comprising:
converting at least some of the guest system code to corresponding native code of the host platform by binary translation; and
for at least one instruction or instruction sequence in the converted guest code whose normal effect is to change the value of the first priority, emitting and including as part of a translation of the instruction or instruction sequence an additional code sequence comprising host-executable code for performing the steps of comparing the current value and the new value with the maximum interrupt priority value, and either abstaining from the emulation of the interrupt controller or running the emulation of the interrupt controller.

6. A method as in claim 1, in which the current value and the new value are task priority values.

7. A method as in claim 1, wherein the computer system comprises a host hardware platform and a guest system running on the host platform, the guest system including a virtualized processor, where the virtualized processor includes a task priority register (TPR) and an interrupt request register (IRR), in which:
the event is the presence of a guest instruction affecting the contents of the TPR; and
the IRR holds the maximum interrupt priority value.

8. A computer program product embodied in a computer-readable storage medium, the computer program product being executable in a computer system comprising a processor and an interrupt controller emulator, wherein the interrupt controller emulator has associated therewith a first priority, the first priority having a current value, wherein a plurality of interrupts are pending with the interrupt controller emulator, a maximum interrupt priority value being defined as a priority value associated with a first interrupt of the plurality of pending interrupts, the first interrupt having the highest priority of all pending interrupts, the computer program product being executed in response to an event, wherein the event gives rise to a new value for the first priority, the computer program product performing a method comprising:
comparing the current value and the new value for the first priority with the maximum interrupt priority value; and
if the current value and the new value are both less than the maximum interrupt priority value or if the current value and the new value are both greater than the maximum interrupt priority value, abstaining from an invocation of the interrupt controller emulator in response to the event without dispatching an interrupt in response to the event; or
if one of the current value and the new value is greater than the maximum interrupt priority value and the other of the current value and the new value is less than the maximum interrupt priority value, invoking the interrupt controller emulator in response to the event to determine whether to dispatch an interrupt in response to the event, wherein when the interrupt controller emulator is invoked in response to the event, the interrupt controller emulator determines a new processor priority value based in part on the new value for the first priority and compares the new processor priority value to the maximum interrupt priority value to determine whether to dispatch an interrupt in response to the event, and wherein a new processor priority value is not determined in response to the event if the current value and the new value are both less than the maximum interrupt priority value or if the current value and the new value are both greater than the maximum interrupt priority value.

9. A computer program product as in claim 8, wherein the computer system further comprises a host hardware platform and a guest system running on the host platform, wherein the interrupt controller emulator is a virtualized Advanced Programmable Interrupt Controller (APIC) comprising a Task Priority Register (TPR) for holding values for the first priority and an Interrupt Request Register (IRR) for holding the maximum interrupt priority value, and wherein the event comprises an attempt to write the new value to the TPR.

10. A computer program product as in claim 9, wherein the virtualized APIC further comprises a Processor Priority Register (PPR) for holding a processor priority value, wherein when the interrupt controller emulator is invoked in response to the event, the interrupt controller emulator determines a new processor priority value based in part on the new value for the first priority and compares the new processor priority value to the maximum interrupt priority value to determine whether to dispatch an interrupt in response to the event, and wherein a new processor priority value is not determined in response to the event if the current value and the new value are both less than the maximum interrupt priority value or if the current value and the new value are both greater than the maximum interrupt priority value.

11. A computer program product as in claim 8, wherein the computer system further comprises a host hardware platform and a guest system running on the host platform, and the event comprises an attempted change by guest system code of the first priority value, the method performed by the computer program product further comprising:
converting at least some of the guest system code to corresponding native code of the host platform by binary translation; and
for at least one instruction or instruction sequence in the converted guest code whose normal effect is to change the value of the first priority, emitting and including as part of a translation of the instruction or instruction sequence an additional code sequence comprising host-executable code for performing the steps of comparing the current value and the new value with the maximum interrupt priority value, and either abstaining from an invocation of the interrupt controller emulator or invoking the interrupt controller emulator.

12. A computer program product as in claim 8, wherein the computer system further comprises a host hardware platform and a guest system running on the host platform, the guest system including a virtualized processor, where the virtualized processor includes a task priority register (TPR) and an interrupt request register (IRR), in which:
the event is the presence of a guest instruction affecting the contents of the TPR; and
the IRR holds the maximum interrupt priority value.

13. A computer system comprising:
a physical, hardware processor;
an interrupt controller emulator; and computer programming instructions executable on the processor for responding to an event and determining whether to invoke the interrupt controller emulator in response to the event, wherein the interrupt controller emulator has associated therewith a first priority, the first priority having a current value, and the event gives rise to a new value for the first priority, wherein a plurality of interrupts are pending with the interrupt controller emulator, a maximum interrupt priority value being defined as a priority value associated with a first interrupt of the plurality of pending interrupts, the first interrupt having the highest priority of all pending interrupts, and wherein the computer programming instructions cause the processor to perform a method in response to the event, the method comprising:

comparing the current value and the new value for the first priority with the maximum interrupt priority value; and if the current value and the new value are both less than the maximum interrupt priority value or if the current value and the new value are both greater than the maximum interrupt priority value, abstaining from an invocation of the interrupt controller emulator in response to the event without dispatching an interrupt in response to the event; or if one of the current value and the new value is greater than the maximum interrupt priority value and the other of the current value and the new value is less than the maximum interrupt priority value, invoking the interrupt controller emulator in response to the event to determine whether to dispatch an interrupt in response to the event.

14. A computer system as in claim 13, further comprising a host hardware platform and a guest system running on the host platform, wherein the interrupt controller emulator is a virtualized Advanced Programmable Interrupt Controller (APIC) comprising a Task Priority Register (TPR) for holding values for the first priority and an Interrupt Request Register (IRR) for holding the maximum interrupt priority value, and wherein the event comprises an attempt to write the new value to the TPR.

15. A computer system as in claim 14, wherein the virtualized APIC further comprises a Processor Priority Register (PPR) for holding a processor priority value, wherein when the interrupt controller emulator is invoked in response to the event, the interrupt controller emulator determines a new processor priority value based in part on the new value for the first priority and compares the new processor priority value to the maximum interrupt priority value to determine whether to dispatch an interrupt in response to the event, and wherein a new processor priority value is not determined in response to the event if the current value and the new value are both less than the maximum interrupt priority value or if the current value and the new value are both greater than the maximum interrupt priority value.

16. A computer system as in claim 13, wherein when the interrupt controller emulator is invoked in response to the event, the interrupt controller emulator determines a new processor priority value based in part on the new value for the first priority and compares the new processor priority value to the maximum interrupt priority value to determine whether to dispatch an interrupt in response to the event, and wherein a new processor priority value is not determined in response to the event if the current value and the new value are both less than the maximum interrupt priority value or if the current value and the new value are both greater than the maximum interrupt priority value.

17. A computer system as in claim 13, further comprising a host hardware platform and a guest system running on the host platform, and the event comprises an attempted change by guest system code of the first priority value, the method performed by the processor further comprising:

converting at least some of the guest system code to corresponding native code of the host platform by binary translation; and for at least one instruction or instruction sequence in the converted guest code whose normal effect is to change the value of the first priority, emitting and including as part of a translation of the instruction or instruction sequence an additional code sequence comprising host-executable code for performing the steps of comparing the current value and the new value with the maximum interrupt priority value, and either abstaining from an invocation of the interrupt controller emulator or invoking the interrupt controller emulator.

18. A computer system as in claim 13, further comprising a host hardware platform and a guest system running on the host platform, the guest system including a virtualized processor, where the virtualized processor includes a task priority register (TPR) and an interrupt request register (IRR), in which:

the event is the presence of a guest instruction affecting the contents of the TPR; and the IRR holds the maximum interrupt priority value.

* * * * *

UNITED STATES PATENT AND TRADEMARK OFFICE
CERTIFICATE OF CORRECTION

PATENT NO. : 7,590,982 B1
APPLICATION NO. : 10/832056
DATED : September 15, 2009
INVENTOR(S) : Boris Weissman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1542 days.

Signed and Sealed this

Twenty-first Day of September, 2010

David J. Kappos
*Director of the United States Patent and Trademark Office*